O. O. SHELINE.
RECEPTACLE HOLDER.
APPLICATION FILED JUNE 10, 1921.
1,423,465. Patented July 18, 1922.
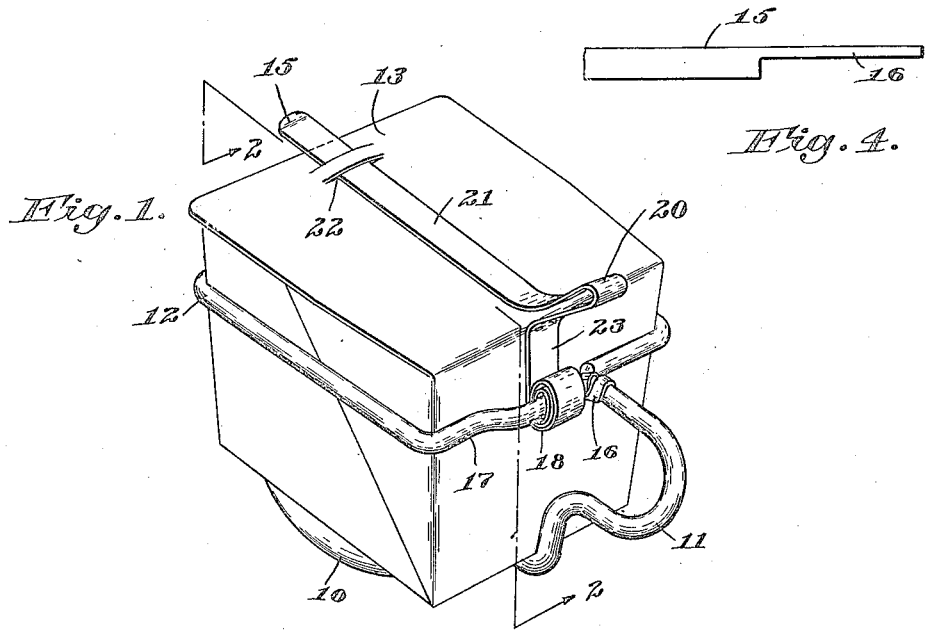
Fig. 1.
Fig. 4.
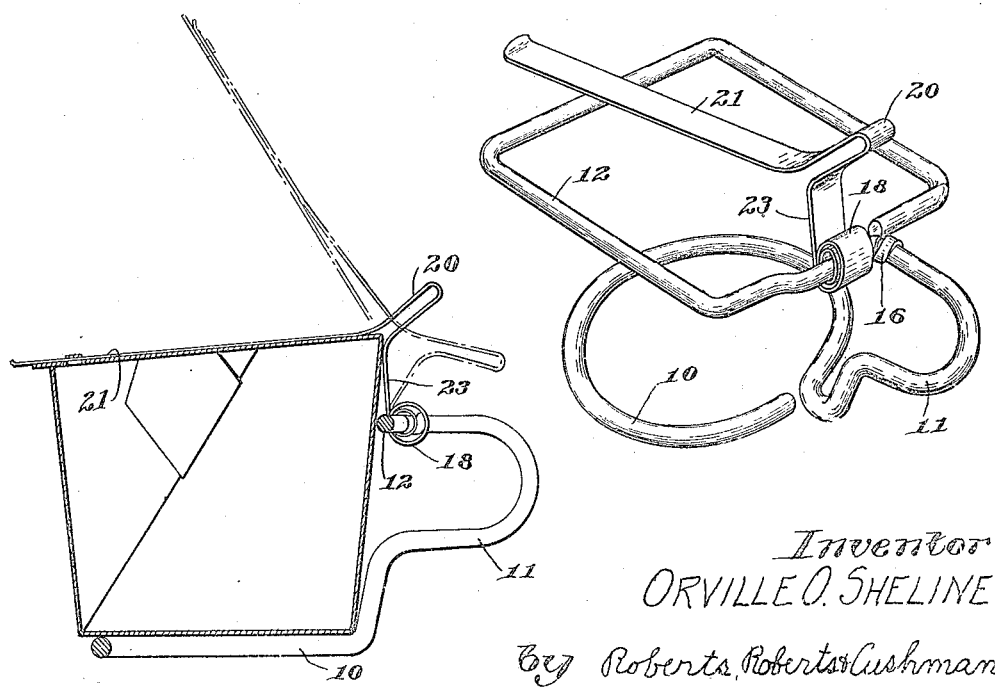
Fig. 2.
Fig. 3.
Inventor
ORVILLE O. SHELINE
By Roberts, Roberts & Cushman
Attorneys

UNITED STATES PATENT OFFICE.

ORVILLE O. SHELINE, OF CHICAGO, ILLINOIS.

RECEPTACLE HOLDER.

1,423,465.  Specification of Letters Patent.  Patented July 18, 1922.

Application filed June 10, 1921. Serial No. 476,456.

*To all whom it may concern:*

Be it known that I, ORVILLE O. SHELINE, a citizen of the United States of America, and resident of Chicago, in the county of Cook and State of Illinois, have invented new and useful Improvements in Receptacle Holders, of which the following is a specification.

This invention relates to a holder for receptacles. It is particularly applicable for holding a sputum receptacle or cup, but it is understood that it is not limited thereto, but may have various other applications.

A holder should be of simple and compact construction and have but few parts. When means are employed therewith for holding the cover of a receptacle in closed position, the structure should be simple and of few parts, and the arrangement should be such as to provide a handle for moving the cover, and to permit free movement thereof.

One of the objects of this invention is to provide a one piece receptacle holder of simple and compact construction which serves as a support and as a handle for the receptacle.

Other objects are: to provide a receptacle holder which may be formed from a single piece of wire, and bent to provide a handle, a support and an upper embracing portion for holding the receptacle securely in place; to provide a holder which is economical to manufacture, together with means associated therewith for yieldingly maintaining the cover in a closed position; to provide in a receptacle holder, a spring finger so arranged as to permit free movement of the receptacle cover, to yieldingly engage the same, and to afford a handle portion which may be conveniently grasped to raise the cover; to provide a holder together with yielding means for maintaining the cover in closed position, which employs but few parts, and which is of light weight.

Other objects and advantages will be apparent from the following description and accompanying drawings, in which:—

Fig. 1 is a perspective of the holder and a receptacle held thereby;

Fig. 2 is a section on line 2—2 of Fig. 1;

Fig. 3 is a perspective showing the holder and the spring finger for holding the cover of the receptacle closed; and Fig. 4 is an enlarged detail of one end of the spring finger.

In general the holder comprises a frame having a base portion 10 upon which the receptacle 14 is adapted to rest, an upper portion 12 adapted to surround or embrace the receptacle, and an intermediate connecting portion 11 arranged to form a handle. There is also provided a spring finger 21 which cooperates to hold the cover in a closed position; the finger is arranged so as to serve as a hinge 18, a handle 20, and as a means for holding the cover in closed position.

As shown the main portion of the holder is formed from a single piece of suitable material, as for example, wire which may be bent preferably in circular shape to form a base 10 upon which the receptacle 14 may rest, then bent upwardly and outwardly to form a handle 11, and then bent to form an upper portion 12 which surrounds or embraces the receptacle. As shown the upper portion 12 is bent in the form of a square, but it is to be understood that the upper portion 12 may assume various shapes to conform to the contour of the receptacle to be held. It is also to be understood that the base 10 and handle 11 may be bent to assume different forms.

In Figs. 1 and 2 a receptacle 14 is shown having a cover 13 which is integral with one of the sides and which is above the upper portion 12 of the holder so that the axis about which the cover pivots is above the portion 12 of the holder. Means are provided for holding the cover in a closed position, which means also serves as a handle 20, whereby the cover 13 may be conveniently raised, said means being so arranged as to serve as a hinge 18 permitting free movement of the cover. As shown, a flat spring finger 15 is employed, having one end 16 thereof suitably connected to the holder as for example by coiling about a portion thereof. The strip is then bent in helical form around the rear side 17 of the upper portion 12 of the holder, which serves as a pivotal point or yielding hinge 18 about which the spring finger may be moved when the cover 21 is raised, and also serves as a spring in addition to the inherent resiliency of the material, for maintaining the cover in a closed position. From the helical coil 18 the finger is continued upward at 23 along the rear of the receptacle to the top thereof, where a handle portion 20 or thumb rest is formed integral with the spring finger. The finger is then continued along the top of the receptacle, and preferably extends under a strip 22 on the cover of the receptacle. It is to be understood that the spring finger may be secured to the holder in any other suitable manner as for example by electrically welding, soldering and the like.

To raise the cover, the handle 20 is pressed downwardly, when the parts will assume the position indicated by the dotted lines in Fig. 2. It is to be noted that by the arrangement shown, in which the pivotal point for the spring finger is out of alinement with the axis about which the cover pivots, that provision is made to permit relative sliding movement between the cover 13 and the portion 21 of the spring finger. It is further to be noted that the helical turns of the spring 18 serve as a hinge to permit free movement of the spring finger. This latter feature is particularly advantageous, in that it eliminates the necessity for the hinge construction such as employed in certain constructions of the prior art, and so enables a simple and compact construction to be had employing few parts. While a flat spring finger is shown, it is to be understood that the invention is not limited thereto as under certain conditions, it may be desired to use round stock in which case, the holder and the spring finger may be formed of one continuous piece of material.

While certain embodiments have been shown, it is to be understood that various changes and modifications may be made without departing from the spirit and scope of the invention.

I claim:

1. A holder adapted to receive a receptacle having a cover mounted thereon comprising means cooperating with the holder to maintain the cover in closed position, said means comprising a continuous strip of flexible material having one end fixedly attached to the holder and the other end attached to the cover of the receptacle.

2. A holder adapted to receive a receptacle having a cover mounted thereon comprising a frame for the receptacle, and a flat spring fast to said frame at one end and wound spirally about a portion thereof to form a hinge, the free end of said spring serving to normally hold the cover closed.

3. A holder adapted to receive a receptacle having a cover mounted thereon comprising a frame for the receptacle, and a flat spring fast to said frame at one end, wound spirally about a portion thereof to form a hinge joint, bent upon itself to form a thumb rest, and having its free end connected to the cover of the receptacle to hold it normally closed.

4. The combination of a receptacle having a cover mounted thereon and a holder formed from a single continuous strip of wire bent to form a base, an upper portion embracing the receptacle and an intermediate connecting portion bent to form a handle, and means arranged on the holder and adapted to maintain the cover in closed position comprising a single continuous strip of spring material secured at one end to the holder and bent intermediate its length to form a thumb rest which may be conveniently pressed to raise the cover.

5. In a receptacle holder formed from a single continuous strip of wire bent to form a base, an upper portion embracing the receptacle and an intermediate connecting portion bent to form a handle, means yieldingly engaging the cover of the receptacle to hold the same in closed position, said means comprising a continuous flat strip of spring material bent intermediate its ends to form a thumb rest, one end of said strip being bent around the upper portion of the holder and secured thereto adjacent the handle of the holder, the other end of said strip extending through an aperture in the cover.

Signed by me at Chicago, Illinois, this second day of June, 1921.

ORVILLE O. SHELINE.